United States Patent
Takao et al.

(10) Patent No.: US 7,029,110 B2
(45) Date of Patent: Apr. 18, 2006

(54) DISPERSION COMPOSITION AND INK-JET PRINTER INK COMPRISING THE SAME

(75) Inventors: Nagayuki Takao, Ryugasaki (JP); Sachie Kawazu, Toride (JP); Kazuki Sakai, Yuki-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 3 days.

(21) Appl. No.: 10/466,091

(22) PCT Filed: Jan. 11, 2002

(86) PCT No.: PCT/JP02/00155

§ 371 (c)(1),
(2), (4) Date: Jul. 11, 2003

(87) PCT Pub. No.: WO02/055602

PCT Pub. Date: Jul. 18, 2002

(65) Prior Publication Data

US 2004/0116552 A1 Jun. 17, 2004

(30) Foreign Application Priority Data

Jan. 11, 2001 (JP) ..................... 2001-004111

(51) Int. Cl.
*B41J 2/01* (2006.01)
*C09D 11/00* (2006.01)

(52) U.S. Cl. .................. 347/100; 347/96; 523/160; 523/161

(58) Field of Classification Search ................ 347/100, 347/96, 95; 523/160, 161; 106/31.13, 31.27, 106/31.6
See application file for complete search history.

(56) References Cited

U.S. PATENT DOCUMENTS

| 4,255,754 | A | | 3/1981 | Crean et al. |
| 6,727,296 | B1 | * | 4/2004 | Pears et al. ............ 523/160 |
| 6,794,425 | B1 | * | 9/2004 | Ellis et al. ............ 523/160 |

FOREIGN PATENT DOCUMENTS

| EP | 0474197 | A1 | | 3/1992 |
| EP | 0489203 | A1 | | 6/1992 |
| EP | 0859037 | A1 | * | 8/1998 |
| EP | 978547 | A1 | * | 2/2000 |
| EP | 1029898 | A2 | * | 8/2000 |
| EP | 1142966 | A1 | | 10/2001 |
| EP | 1148103 | A1 | | 10/2001 |
| GB | 2001083 | A | | 1/1979 |
| JP | 8-109343 | A | | 4/1996 |
| JP | 9-87570 | A | | 3/1997 |
| JP | 10-87768 | A | | 4/1998 |
| JP | 11-80633 | A | | 3/1999 |
| JP | 11-172180 | | * | 6/1999 |
| JP | 11-172180 | A | | 6/1999 |
| JP | 11-181344 | A | | 7/1999 |
| JP | 11-199783 | A | | 7/1999 |
| JP | 11-199783 | | * | 7/1999 |
| JP | 11-256087 | A | | 9/1999 |
| JP | 11-269418 | A | | 10/1999 |
| JP | 2000-212486 | A | | 8/2000 |
| JP | 2000-303015 | A | | 10/2000 |
| JP | 2000-327974 | A | | 10/2000 |
| JP | 2000-03015 | A | | 11/2000 |
| JP | 2000-327974 | A | | 11/2000 |
| JP | 2001-181512 | A | | 7/2001 |
| JP | 2001-181549 | A | | 7/2001 |
| JP | 2002-3768 | A | | 1/2002 |
| JP | 2002-80772 | A | | 3/2002 |
| WO | WO 98/27171 | | * | 6/1998 |
| WO | WO 98/27171 | A1 | | 6/1998 |
| WO | WO02/10280 | A1 | | 2/2002 |

OTHER PUBLICATIONS

English language abstract of JP 2000128875 (May 5, 2000).

* cited by examiner

*Primary Examiner*—Manish Shah
(74) *Attorney, Agent, or Firm*—Birch, Stewart, Kolasch & Birch, LLP

(57) ABSTRACT

A dispersion composition including a colorant and an acrylic polymer having the furan structure, and an ink for an ink jet printer including such a dispersion composition. This dispersion composition can achieve the satisfactory stability of the colorant irrespective of the kind of the colorant, and allows the inks to be formulated to have the same composition. The ink for an ink jet printer has good storage stability and printing stability.

5 Claims, No Drawings

DISPERSION COMPOSITION AND INK-JET PRINTER INK COMPRISING THE SAME

This application is the national phase under 35 U.S.C. § 371 of PCT International Application No. PCT/JPO2/00155 which has an International filing date of Jan. 11, 2002, which designated the United States of America.

FIELD OF THE INVENTION

The present invention relates to a dispersion composition and an ink jet printer ink comprising the same. In particular, the present invention relates to a dispersion composition which is used in technical fields where pigments or dyes insoluble in solvents are used with dispersing them in liquid media, for example, paints, printing inks, toners or inks for ink jet printers, and an ink jet printer ink comprising such a dispersion composition. Furthermore, the present invention relates to a dispersion composition which can be used in the form of a colorant which is encapsulated with a polymer by drying, for example, a dry type toner or a powder paint, or in the field of plastics.

BACKGROUND OF THE INVENTION

In the fields where pigments or dyes insoluble in solvents are used with dispersing them in liquid media, the particle size of such pigments or dyes are made very small and various measures are proposed to improve the storage stability of dispersions. For example, UK 2 001 083 discloses the use of a specific polyester amine as a dispersant for pigments in paints or inks. JP-A-9-87570 discloses an aqueous pigment dispersion comprising a water-soluble nitrogen-containing acrylic resin which is prepared by copolymerizing an α,β-ethylenically unsaturated carboxylic acid and an α,β-ethylenically unsaturated nitrogen-containing monomer. JP-A-2000-242486 discloses an aqueous ink composition for ink jet printing comprising a general acrylic acid copolymer as a dispersant.

JP-A-11-269418 discloses an aqueous ink composition for ink jet printing comprising a block copolymer, and JP-A-10-87768 discloses an aqueous ink composition for ink jet printing comprising a graft-polymer.

JP-A-11-080633 discloses an ink for ink jet printing containing coloring resin particles which consist of pigment particles coated (micro-capsulated) with a resin having a carboxyl group.

However, the kinds of pigments, which can be used in dispersion compositions comprising general dispersion stabilizers or the above pigment dispersants are limited. Thus, in fields which require full color printing such as printing inks or ink-jet printing inks, ink compositions have been developed using various dispersants suitable for cyan, magenta, yellow and black colorants respectively. Thus, when ink compositions are formulated, it is difficult for all the four color inks have the same composition, and each ink composition should be specifically formulated, which takes labors and times. Furthermore, only a few ink-jet printing inks have satisfactory ejection stability.

When the block copolymer, the graft polymer or the micro-capsulated pigments are used, it may be possible to formulate the same composition for all the colors. However, the synthesis of such polymers and the production of microcapsules require various production steps and thus need increased costs and energy for producing dispersion compositions in comparison with the synthesis of usual copolymers.

SUMMARY OF THE INVENTION

One object of the present invention is to provide a dispersion composition which has a satisfactory stability of a colorant irrespective of the kind of a colorant, and thus to make it possible to formulate inks having the same composition and to save the labor or time, costs, energy, etc. required for the preparation of inks or paints.

Another object of the present invention is to provide a dispersion composition of a colorant, which has good ink-storageability and print-stability, when it is used as an ink-jet printing ink.

The inventors have found that the above objects can be achieved when an acrylic polymer having a furan structure is added to a dispersion composition containing a colorant and a polymer.

According to the researches carried out by the inventors, it has been found that, when an acrylic polymer having a furan structure is used as a dispersant for a colorant, the oxygen atom of the furan structure is adsorbed on a high polarity part of the colorant to increase the steric repellence between the particles of the colorant and thus to prevent the sedimentation of the particles and increase the stability of the dispersion. Accordingly, in the aqueous dispersion, electrical interaction is formed between the molecules in addition to hydrophobic interaction between the resinous colorant. Therefore, with colorants having different polarities from hydrophobic to hydrophilic one, a dispersion composition can be prepared using only one kind of a dispersant, and various inks can be formulated to have the same composition.

As an acrylic polymer having the furan structure, a graft polymer, a block copolymer or a random copolymer is preferable. In particular, the random copolymer is preferable since it can be synthesized without troublesome polymerization procedures.

BEST EMBODIMENTS FOR CARRYING OUT THE INVENTION

The composition of the dispersion of the present invention may not be limited as long as it contains at least a colorant and an acrylic polymer having the furan structure.

The acrylic polymer having the furan structure should have the five-membered furan structure including one oxygen atom.

Examples of the furan structure include furyl, furfural, pyromucic acid, furfuryl, coumaron, coumarane, phthalide, fulgid, etc. Among them, furfuryl is preferable since it has high adsorptivity.

Preferably, the acrylic polymer having the furan structure is an acrylic polymer prepared by copolymerizing at least one monomer having the furan structure and at least one other monomer having a solubility parameter of 9.5 or less. The other monomer is used to improve the dispersion stability of the colorant by inducing the interaction with the hydrophobic part of the highly hydrophobic colorant.

Examples of the monomer having the furan structure include tetrahydrofurfuryl acrylate, tetrahydrofurfuryl methacrylate, etc.

Examples of the monomer having a solubility parameter of 9.5 or less include (meth)acrylates such as methyl acrylate, ethyl acrylate, isopropyl acrylate, n-propyl acrylate, n-butyl acrylate, tert-butyl acrylate, benzyl acrylate, methyl methacrylate, ethyl methacrylate, isopropyl methacrylate, n-propyl methacrylate, n-butyl methacrylate, isobutyl methacrylate, tert-butyl methacrylate, tridecyl methacrylate, benzyl methacrylate, 2-ethylhexyl acrylate, 2-ethylhexyl methacrylate, octyl acrylate, octyl methacrylate, lauryl acrylate, lauryl methacrylate, cetyl acrylate, cetyl methacrylate, stearyl acrylate, stearyl methacrylate, behenyl acrylate, behenyl methacrylate, etc.; styrenic monomers such as styrene, α-methylstyrene, o-, m- or p-methylstyrene, p-tert-butylsytrene, etc.; vinyl acetate; alpha-olefins such as ethylene; and the like. Among them, the styrenic monomers and (meth)acrylate monomers having 5 or more carbon atoms in the alkyl group are particularly preferable since they can improve the affinity of the polymer with the colorants.

The acrylic polymer having the furan structure preferably comprises 3 to 50 wt. %, more preferably 5 to 40 wt. % of the monomer having the furan structure. When the amount of the monomer having the furan structure is less than 3 wt. %, the interaction between the polymer and the high polarity colorants is weak. When the amount of the monomer having the furan structure exceeds 50 wt. %, the polarity of the dispersant becomes too high so that the interaction between the polymer and the hydrophobic colorants decreases so that the dispersion stability of the colorant cannot be improved.

The acid value of the acrylic polymer having the furan structure is preferably from 30 to 400 mg-KOH/g, more preferably from 50 to 300 mg-KOH/g. In the case of an aqueous dispersion composition, when the acid value is less than 30 mg-KOH/g, the solubility of the polymer in water decreases so that the colorants may not be well dispersed. When the acid value exceeds 400 mg-KOH/g, the interaction between the polymer and the colorants decreases so that the dispersion stability deteriorates.

Preferable examples of the monomers which give a suitable acid value include monomers having a carboxyl group such as acrylic acid, methacrylic acid, crotonic acid, ethacrylic acid, propylacrylic acid, isopropylacrylic acid, itaconic acid, fumaric acid, acryloyloxyethyl phthalate, acryloyloxy succinate, etc.; monomers having a sulfonic acid group such as ethyl acrylic acid-2-sulfonate, ethyl methacrylic acid-2-sulfonate, butylacrylamide sulfonate, etc.; monomers having a phosphonic acid group such as ethyl acrylic acid-2-phosphonate, ethyl methacrylic acid-2-phosphonate; and the like. Among them, the monomers having the carboxyl group, in particular, acrylic acid and methacrylic acid are preferable.

The acrylic polymer having the furan structure preferably has a weight average molecular weight of 3,000 to 50,000, more preferably 4,000 to 40,000. When the weight average molecular weight is less than 3,000, the dispersion stability decreases. When the weight average molecular weight exceeds 50,000, the viscosity of the ink or paint increases so that the printing or coating becomes difficult.

Besides the above monomers, the acrylic polymer having the furan structure may comprise the following monomer(s):

itaconates such as benzyl itaconate, etc.; maleates such as dimethyl maleate, etc.; fumarates such as dimethyl fumarate, etc.; acrylonitrile, methacrylonitrile, vinyl acetate; monomers having a hydroxyl group such as 2-hydroxyethyl acrylate, 2-hydroxyethyl methacrylate, hydroxypropyl acrylate, hydroxypropyl methacrylate, glycerol monomethacrylate, polyethylene glycol monomethacrylate, propylene glycol monomethacrylate, polyethylene glycol monoacrylate, propylene glycol monoacrylate, etc.; monomers having a glycidyl group such as glycidyl acrylate, glycidyl metharylate, etc.; monomers having a methoxy group such as methoxypolyethylene glycol acrylate, methoxypolyethylene glyocol methacrylate, etc.; monomers having an amino group, for example, monomers having a primary amino group such as acryl amide, methacryl amide, acrylic acid amide, aminoethyl acrylate, aminopropyl acrylate, methacrylic acid amide, aminoethyl methacrylate, aminopropyl methacrylate, etc., monomers having a secondary amino group such as methylaminoethyl acrylate, methylaminopropyl acrylate, ethylaminoethyl acrylate, ethylaminopropyl acrylate, methylaminoethyl methacrylate, methylaminopropyl methacrylate, ethylaminoethyl methacrylate, ethylaminopropyl methacrylate, 2-vinylpyridine, 4-vinylpyridine, etc., monomers having a tertiary amino group such as dimethylaminoethyl acrylate, diethylaminoethyl acrylate, dimethylaminopropyl acrylate, diethylaminopropyl acrylate, dimethylaminoethyl methacrylate, diethylaminoethyl methacrylate, dimethylaminopropyl methacrylate, diethylaminopropyl methacrylate, etc., and monomers having a quaternary amino group such as dimethylaminoethyl methyl acrylate chloride, dimethylaminoethyl methyl acrylate chloride, dimethyhlaminoethyl benzyl acrylate chloride, dimethylaminoethyl benzyl methacrylate chloride, etc.; silicone monomers; and the like.

When the acrylic polymer having the furan structure is synthesized, any conventional polymerization initiator can be used. Preferred examples of the polymerization initiator include peroxides such as tert-butyl peroxybenzoate, di-tert-butyl peroxide, cumene perhydroxide, acetyl peroxide, benzoyl peroxide, lauroyl peroxide, etc.; azo compounds such as azobisisobutyronitrile, azobis-2,4-dimethylvaloronitile, azobiscyclohexanecarbonitrile, etc.; and the like.

The synthesis of the acrylic polymer having the furan structure can be carried out in a solvent. Preferred examples of the solvent include aliphatic hydrocarbons such as hexane, mineral spirit, etc.; aromatic hydrocarbons such as benzene, toluene, xylene, etc.; esters such as butyl acetate, etc.; alcohols such as methanol, butanol, isopropanol, ethanol, etc.; ketones such as methyl ethyl ketone, isobutyl methyl ketone, etc.; aprotic solvents such as dimethylformaide, dimethylsulfoxide, N-methylpyrrolidone, pyridine, etc.; water; and the like. Among them, water-soluble solvents such as isopropanol, methyl ethyl ketone, and so on are more preferable. These solvents may be used as a mixture of two or more of them.

The polymerization reaction may be carried out by any conventional method such as bulk polymerization, solution polymerization, suspension polymerization, emulsion polymerization, redox polymerization, etc. Among them, the solution polymerization is preferable since the reaction process is simple.

The polymerization reaction conditions depend on the kinds of the polymerization initiator, solvents and so on. The reaction temperature is usually 180° C. or less, preferably from 30 to 150° C., and the reaction time is usually from 30 minutes to 40 hours, preferably from 2 to 30 hours.

The colorant to be contained in the composition of the present invention is preferably an inorganic pigment, an organic pigment, a disperse dye, etc.

Preferred examples of the inorganic pigment include carbon black, titanium oxide, chinese white, zinc oxide, lithopon, iron oxide, aluminum oxide, silicon dioxide, kaolinite, montmorillonite, talc, barium sulfate, calcium carbonate, silica, alumina, cadmium red, red oxide, molybdenum red, chromium vermilion, molybdate orange, chrome yellow, chromium yellow, cadmium yellow, yellow iron oxide, titanium yellow, chromium oxide, viridian, cobalt green, titanium cobalt green, cobalt chromium green, ultramarine, ultramarine blue, Prussian blue, cobalt blue, cerulean blue, manganese violet, cobalt violet, mica, etc.

Preferred examples of the organic pigment azo pigments, azomethine pigments, polyazo pigments, phthalocyanine pigments, quinacridone pigments, anthraquinone pigments, indigo pigments, thioindigo pigments, quinophthalone pigments, benzimidazolone pigments, isoindoline pigments, isoindolinone pigments, etc.

Preferred examples of the disperse dye include azo dyes, anthraquinone dyes, indigo dyes, phthalocyanine dyes, carbonyl dyes, quinone imine dyes, methine dyes, quinoline dyes, nitro dyes, etc.

In the dispersion composition of the present invention, the amount of the acrylic polymer having the furan structure is preferably from 2 to 1000 parts by weight, more preferably from 5 to 500 parts by weight, based on 100 parts by weight of the colorant. When the amount of the acrylic polymer is less than 2 parts by weight, the stability of the dispersion may deteriorate. When the amount of the acrylic polymer exceeds 1000 parts by weight, the content of the colorant in the dispersion composition decreases so that the composition may not have the sufficient concentration of the particles for being used as a paint, an ink or a toner.

The amount of the colorant is preferably 1 to 50 parts by weight, more preferably 5 to 40 parts by weight, based on 100 parts by weight of the dispersion composition. When the amount of the colorant is less than 1 part by weight, the color density is too low when the composition is used as an ink or a paint. When the amount of the colorant exceeds 50 parts by weight, the viscosity of the composition becomes too high so that the handling of the composition may be difficult.

Examples of the solvent to be used in the dispersion composition of the present invention include aliphatic hydrocarbons such as hexane, mineral spirits; silicone oils such as dialkylpolysiloxane, cyclic polydialkylsiloxane, etc.; vegetable oils such as olive oil, safflower oil, sunflower oil, soybean oil, linseed oil, etc.; aromatic hydrocarbons such as benzene, toluene, xylene, etc.; esters such as butyl acetate, etc.; alcohols such as methanol, ethanol, isopropanol, butanol, etc.; ketones such as methyl ethyl ketone, isobutyl methyl ketone, etc.; aprotic solvents such as dimethylformaide, dimethylsulfoxide, N-methylpyrrolidone, pyridine, etc.; water; and the like. Among them, water and water-soluble solvents are more preferable. These solvents may be used independently or as a mixture of two or more of them.

The dispersion composition of the present invention may be prepared by any conventional method using a commonly used dispersing apparatus. Examples of the dispersion apparatus include vessel-driving medium type mills such as a roll mill, a ball mill, a centrifugal mill, a planetary ball mill, etc., high-speed rotational mills such as a sand mill, etc., or medium-agitation mills such as an agitation vessel type mill, and the like.

Specifically, the dispersion composition of the present invention can be prepared by neutralizing the acrylic polymer having the furan structure with a neutralizing agent, dissolving the neutralized polymer in water, adding the colorant in the aqueous solution and mixing them uniformly. Then, if necessary, a defoaming agent or a water-soluble organic solvent is added, and the mixture is dispersed with the dispersing apparatus exemplified above to achieve the desired particle size. Furthermore, the dispersion composition may be heated at a temperature of 40 to 100° C. to stabilize the dispersion.

As the dispersing medium of the dispersing apparatus, glass beads, steel beads, ceramic beads, etc. can be used. Among them, the ceramic beads having a particle size of 0.01 to 1.0 mm are preferably used.

The dispersing conditions are not particularly limited. In the case of the planetary ball mill, the dispersing is carried out at an acceleration of 5 to 50 G, and in the case of the sand mill, the dispersing is carried out at a filling rate of 50 to 90% of the ceramic beads at a peripheral speed of 5 to 20 m/sec.

Examples of the neutralizing agent include alkali metal hydroxides such as lithium hydroxide, sodium hydroxide, potassium hydroxide, etc., ammonia, organic amines such as triethylamine, triethanolamine, diethanolamine, ethanolamine, dimethylaminoethanol, etc. In particular, non-volatile neutralizing agents are preferably used, since they can prevent clogging of a printer head when the dispersion composition is used as an ink for ink jet printers.

The application fields of the dispersion composition of the present invention are not limited. The dispersion composition of the present invention may be used in the fields of paints, printing inks, toners, inks for ink jet printers, etc. In particular, it is used as an ink for ink jet printers.

The composition of an ink for ink jet printers, which comprises the dispersion composition of the present invention, is not limited as long as it comprises the dispersion composition. Such an ink may contain various additives which are conventionally contained in the inks for ink jet printers, for example, water-soluble organic solvents, pH adjusters, surfactants, clogging-preventing agents for printing heads, ink-defoaming agents, disinfectants, antifungi, water-resistance-imparting agents for prints, charge-controlling agents, etc.

The amount of the dispersion composition of the present invention in the ink for ink jet printers is preferably selected so that the amount of the colorant is 1 to 10% by weight based on the weight of the ink (100% by weight). When the amount of the colorant is less than 1% by weight, a sufficient color (image) density is not attained. When the amount of the colorant exceeds 10% by weight, the viscosity of the ink becomes to high so that the ink cannot be used for ink jet printing.

Preferably, the ink for ink jet printers according to the present invention can contain at least one water-soluble organic solvent selected from the group consisting of water-soluble polyhyddric alcohols, since the drying of the ink is prevented, or the redispersibility of the colorant in the solvent is achieved after being dried. The amount of the water-soluble organic solvent to be added is preferably from 4 to 30% by weight, more preferably from 4 to 20% by weight, based on the weight of the ink (100% by weight). When the amount of the water-soluble organic solvent is 4% by weight or more, the property to prevent the clogging of the printing head is sufficiently improved. When the amount of the water-soluble organic solvent is 30% by weight or less, the organic nature of the solution is suppressed so that the dispersibility of the colorant is not deteriorated.

Examples of the water-soluble organic solvent include ethylene glycol, diethylene glycol and glycerin. Other organic solvents and various additives may be used in combination with these alcohols. Examples of other organic solvents include triethylene glycol, triproylene glycol, dimethylsulfoxide, diacetone alcohol, glycerin monoallyl ether, propylene glycol, polyethylene glycol, thiodiglycol, N-methyl-2-pyrrolidone, 2-pyrrolidone, γ-butyrolactone, 1,3-dimethyl-2-imidazolidinone, sulforane, trimethylolpropane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonitrilacetone, pentaerithritol, hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propyleneglycol monobutyl ether, dipropylene glycol monomethyl ether, dipropylene glycol monopropyl ether, dipropylene glycol monobutyl ether, tripropylene glycol monomethyl ether, glycerin monoacetate, glycerin diacetate, glycerin triacetate, ethylene glycol monomethyl ether acetate, diethylene glycol monomethyl ether acetate, cyclohexanol, 1-butanol, 2,5-hexanediol, ethanol, n-propanol, 2-propanol, 1-methoxy-2-propanol, furfuryl alcohol, tetrahydrofurfuryl alcohol, 1,2-butanediol, 1,4-butanediol, 1,3-butanediol, 2,4-pentanediol, 1,5-pentanediol, 2-methyl-2,4-pentanediol, 1,2-cyclohexanediol, 1,4-cyclohexanediol, trimethylolethane, trimethylolpropane, 1,2,4-tributanetriol, 1,2,6-hexanetriol, 1,2,5-pentanetriol, 3-methyl-1,5-pentanediol, 3-hexene-2,5-diol, polyethylene glycol, polyproylene glycol, etc. These solvents may be used as a mixture of two or more of them.

As a pH adjuster, at least one compound selected from water-soluble inorganic salts and hydroxides, and the pH of the ink for ink jet printers is adjusted in a range from 7 to 10. Thereby, the clogging of the nozzle can be effectively prevented. Examples of the water-soluble inorganic salts include sodium carbonate, calcium carbonate, etc., and examples of the water-soluble inorganic hydroxides include lithium hydroxide, sodium hydroxide, calcium hydroxide, magnesium hydroxide, calcium hydroxide, etc.

Furthermore, the ink for ink jet printers according to the present invention preferably contains a resin to increase the water resistance, gloss and abrasion resistance of the prints. A preferable resin is a water-soluble resin, or a dispersion type resin having an average particle size of 10 to 300 nm. Examples of the resin includes acrylic resins, vinyl resins, polyeter resins, amide resins, etc. and their copolymers. The amount of the resin is preferable from 1 to 15% by weight, more preferably from 2 to 10% by weight, based on the weight of the ink (100% by weight), in view of the viscosity or other properties of the ink.

Examples of the defoaming agents include cationic surfactants such as alkyl benzenesulfonates, alkyl sulfate esters, fatty acid salts, quaternary amminium salts, etc.; amphoteric surfactants such as alkylbetaines, aminoxides, etc.; non-ionic surfactants; nonionic organic silicone suractants such as methylpolysiloxane copolymers, etc.; and so on. Examples of the antifungi or disinfectants are benzoate salts, alkylamine salts, quaternary ammonium salts, etc. Examples of the defoaming agents also include fatty acid esters such as sorbitan esters, polyoxyethylene alkyl ethers and silicone oils.

Furthermore, it is preferable to add a surfactant to the ink according to the present invention since the printing stability is improved. In particular, the addition of the surfactant can make it possible to stably generate bubbles by heating nozzles in thermal type ink jet printers. The amount of the surfactant is preferably from 0.5 to 5% by weight in view of the printing stability.

From the viewpoint of printing stability, preferable surfactants are water-soluble ionic surfactants and nonionic surfactants having a HLB value of at least 12. The kind of the surfactant is not critical as long as it is water soluble or it has a HLB value of at least 12. Any of anionic surfactants, cationic surfactants, nonionic surfactants and amphoteric surfactants may be used. Among them, anionic surfactants and nonionic surfactants are particularly preferable.

Examples of the anionic surfactants include fatty acid salts such as sodium sterate soap, potassium oleate soap, semi-hardened tallow fatty acid sodium salt soap, etc.; alkyl sulfate salts such as sodium lauryl sulfate, triethanolamine lauryl sulfate, sodium higher alcohol sulfate, etc.; alkyl benzenesulfonate salts such as sodium dodecylbenzenesulfonate, etc.; alkyl naphthalanesulfonate salts such as sodium alkyl naphthalenesulfonate, etc.; alkyl sulfosuccinate salts such as sodium dialkyl sulfosuccinate, etc.; alkyldiphenyl ether disulfonate salts such as sodium alkyldiphenyl ether disulfonate, etc.; alkyl phosphate salts such as potassium alkyl phosphate, etc.; polyoxyethylene alkyl sulfate ester salts such as sodium polyoxyethylene lauryl ether sulfate, trietnanolamine polyoxyethylene alkyl sulfate, etc.; alkylaryl sulfate ester salts such as sodium polyoxyethylene alkylphenyl ether sulfate, etc.; polyoxyethylene alkyl phosphate esters; naphthalene sulfinic acid-formalin condensate; and so on.

Examples of the cationic surfactants include alkylamine salts such as coconut amine acetate, stearylamine acetate, etc.; quaternary ammonium salts such as lauryltrimethylammonuim chloride, stearyltrimethylammonium chloride, alkylbenzyldimethylammonium chloride, etc.; alkylbetaines such as laurylbetaine, stearylbetaine, etc.; amine oxides such as lauryldimethylamine oxide, etc.; and so on.

Examples of the nonionic surfactants having a HLB value of at least 12 include polyoxyethylene alkyl ethers such as polyoxyethylene lauryl ether, polyoxyethylene cetyl ether, polyoxyethylene stearyl ether, polyoxyethylene oleyl ether, polyoxylethylene higher alcohol ether, etc.; polyoxyethylene alkylaryl ethers such as polyoxyethyene octylphenyl ether, polyoxyethylene nonylphenyl ether, etc.; polyoxyethylene derivatives; ethylene oxide-propylene oxide block copolymers; sorbitan fatty acid esters; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, etc.; polyoxyethylene sorbitol fatty acid esters such as polyoxyethylene sorbitol tetraoleate, etc.; glycerin fatty acid esters; acetylene glycol; and so on.

When the ink according to the present invention is used in ink jet printers which apply charges to the ink, it may contain an electrolyte to adjust a conductivity of the ink in a specific range. The electrolyte may be added to the ink at an arbitrary amount since the conductivity required depends on the type of the printer, and the inks have different conductivities depending on the kinds of other components. Examples of the electrolyte suitable for such a purpose include inorganic salts such as ammonium chloride, sodium chloride, lithium nitrate, ammonium nitrate, ammonium thiocyanate, potassium thiocyanate, sodium thiocyanate, ammonium nitrite, lithium acetate, potassium acetate, ammonium acetate, etc.; triethanolamine hydrochloride, triethanolamine nitrate, triethanolamine sulfate, and so on.

The ink for ink jet printers according to the present invention may be prepared with a conventional mixer, and it is not necessary to use a disperser having a high dispersion ability.

The ink for ink jet printers according to the present invention may be used in any printer as long as a printer is a piezo type ink jet printer, a thermal type ink jet printer, or a continuous ink jet printer. For example, the ink of the present invention can be used in printers disclosed in JP-A-08-109343 and U.S. Pat. No. 4,255,754.

EXAMPLES

The present invention will be illustrated by the following Examples and Comparative Examples.

Hereinafter, "parts" and "%" are "parts by weight" and "% by weight" unless otherwise indicated. All the reagents used were first grade reagents available from WAKO JUN-YAKU. The particle sizes and particle size distributions of the pigments and disperse dyes were measured with a laser-Doppler type particle size distribution meter N4 PLUS (manufactured by Coulter).

Synthetic Example 1

Preparation of Acrylic Polymer Having a Furan Structure

The following components were mixed to obtain a solution:

| | |
|---|---|
| n-Butyl acrylate | 37.9 parts |
| Lauryl methacrylate | 20.0 parts |
| Tetrahydrofurfuryl methacrylate (Kyoeisha Chemical Co., Ltd.) | 20.0 parts |
| Acrylic acid | 22.1 parts |
| Perhexyl O (a peroxy ester available from NOF Corporation) | 8.0 parts |

Then, isopropanol (100 parts) was charged in a reactor equipped with a nitrogen inlet and heated to a refluxing temperature under the nitrogen atmosphere. The above solution was dropwise added to isopropanol over 2 hours. After the addition of the solution, the monomers were reacted at the refluxing temperature for 14 hours. The solution after the reaction had a non-volatile content of 52.1% and contained a polymer having an acid value of 159 mg-KOH/g and a weight average molecular weight of 9500. Then, the polymer was neutralized with sodium hydroxide to a neutralization degree of 100%, and isopropanol in the solution was replaced with ion-exchanged water to obtain a 50% aqueous solution of the polymer.

Synthetic Example 2

Preparation of Acrylic Polymer Having a Furan Structure

The following components were mixed to obtain a solution:

| | |
|---|---|
| n-Butyl acrylate | 42.9 parts |
| Styrene | 20.0 parts |
| Tetrahydrofurfuryl methacrylate (Kyoeisha Chemical Co., Ltd.) | 15.0 parts |
| Acrylic acid | 22.1 parts |
| Perhexyl O (a peroxy ester available from NOF Corporation) | 4.0 parts |

Then, isopropanol (100 parts) was charged in a reactor equipped with a nitrogen inlet and heated to a refluxing temperature under the nitrogen atmosphere. The above solution was dropwise added to isopropanol over 2 hours. After the addition of the solution, the monomers were reacted at the refluxing temperature for 14 hours. The solution after the reaction had a non-volatile content of 51.9% and contained a polymer having an acid value of 157 mg-KOH/g and a weight average molecular weight of 18,000. Then, the polymer was neutralized with sodium hydroxide to a neutralization degree of 100%, and isopropanol in the solution was replaced with ion-exchanged water to obtain a 50% aqueous solution of the polymer.

Synthetic Example 3

Preparation of Acrylic Polymer Having a Furan Structure

The following components were mixed to obtain a solution:

| | |
|---|---|
| n-Butyl acrylate | 47.0 parts |
| Lauryl methacrylate | 20.0 parts |
| Tetrahydrofurfuryl methacrylate (Kyoeisha Chemical Co., Ltd.) | 20.0 parts |
| Acrylic acid | 13.0 parts |
| Perhexyl O (a peroxy ester available from NOF Corporation) | 8.0 parts |

Then, isopropanol (100 parts) was charged in a reactor equipped with a nitrogen inlet and heated to a refluxing temperature under the nitrogen atmosphere. The above solution was dropwise added to isopropanol over 2 hours. After the addition of the solution, the monomers were reacted at the refluxing temperature for 14 hours. The solution after the reaction had a non-volatile content of 52.3% and contained a polymer having an acid value of 92 mg-KOH/g and a weight average molecular weight of 9400. Then, the polymer was neutralized with sodium hydroxide to a neutralization degree of 100%, and isopropanol in the solution was replaced with ion-exchanged water to obtain a 50% aqueous solution of the polymer.

Synthetic Example 4

Preparation of Acrylic Polymer Having a Furan Structure

The following components were mixed to obtain a solution:

| | |
|---|---|
| n-Butyl acrylate | 28.8 parts |
| Lauryl methacrylate | 20.0 parts |
| Tetrahydrofurfuryl methacrylate (Kyoeisha Chemical Co., Ltd.) | 20.0 parts |
| Acrylic acid | 31.2 parts |
| Perhexyl O (a peroxy ester available from NOF Corporation) | 8.0 parts |

Then, isopropanol (100 parts) was charged in a reactor equipped with a nitrogen inlet and heated to a refluxing temperature under the nitrogen atmosphere. The above solution was dropwise added to isopropanol over 2 hours. After the addition of the solution, the monomers were reacted at the refluxing temperature for 14 hours. The solution after the reaction had a non-volatile content of 52.5% and contained a polymer having an acid value of 221 mg-KOH/g and a weight average molecular weight of 5400. Then, the polymer was neutralized with sodium hydroxide to a neutralization degree of 100%, and isopropanol in the solution was replaced with ion-exchanged water to obtain a 50% aqueous solution of the polymer.

Synthetic Example 5

Preparation of Styrene-acrylic Acid Copolymer Resin

According to the Example of JP-A-2000-212486, a water-soluble acrylic polymer was prepared by the following procedure.

The following components were mixed to obtain a solution:

| | |
|---|---|
| Acrylic acid | 15.7 parts |
| Styrene | 84.3 parts |
| Perhexyl O (a peroxy ester available from NOF Corporation) | 8.0 parts |

Then, methyl ethyl ketone (100 parts) was charged in a reactor equipped with a nitrogen inlet and heated to a refluxing temperature under the nitrogen atmosphere. The above solution was dropwise added to methyl ethyl ketone over 2 hours. After the addition of the solution, the monomers were reacted at the refluxing temperature for 14 hours. The solution after the reaction had a non-volatile content of 51.9% and contained a polymer having an acid value of 118 mg-KOH/g and a weight average molecular weight of 8000. Then, the polymer was neutralized with sodium hydroxide to a neutralization degree of 100%, and methyl ethyl ketone in the solution was replaced with ion-exchanged water to obtain a 50% aqueous solution of the polymer.

Synthetic Example 6

Preparation of Graft Polymer

According to the Example of JP-A-10-87768, a graft polymer was prepared by the following procedure. This synthesis was very troublesome in comparison with the preparation of the above random copolymers.

| Preparation of macromonomer: | |
|---|---|
| Part 1 | |
| Isopropanol | 530.5 parts |
| Acetone | 77.5 parts |
| Methacrylic acid | 70.1 parts |
| Ethoxyethylene glycol methacrylate | 12.4 parts |
| Part 2 | |
| Diaquabis(phoronedifluorodiphenyl-glyoxymato) cobaltate (II) | 0.1035 part |
| 2,2'-Azobis(2,2-methylbutylnitrile) | 0.78 part |
| Acetone | 21.5 parts |
| Part 3 | |
| Methacrylic acid | 280.1 parts |
| Ethoxytriethylene glycol methacrylate | 49.4 parts |
| Part 4 | |
| Diaquabis(phoronedifluorodiphenyl-glyoxymato) cobaltate (II) | 0.1035 part |
| 2,2'-Azobis(2,2-methylbutylnitrile) | 4.5 parts |
| Acetone | 47.5 parts |
| Part 5 | |
| Diaquabis(phoronedifluorodiphenyl-glyoxymato) cobaltate (II) | 0.041 part |
| 2,2'-Azobis(2,2-methylbutylnitrile) | 2.3 parts |
| Acetone | 40.5 parts |
| Part 6 | |
| Diaquabis(phoronedifluorodiphenyl-glyoxymato) cobaltate (II) | 0.062 part |
| 2,2'-Azobis(2,2-methylbutylnitrile) | 2.3 parts |
| Acetone | 40.5 parts |

Each set of the components of Parts 1 to 6 was mixed to obtain each solution of Parts 1 to 6.

Then, the solution of Part 1 was charged in a 3 liter reactor. equipped with a nitrogen inlet and heated to a refluxing temperature under the nitrogen atmosphere and maintained at the refluxing temperature for 20 minutes. The solution of Part 2 was added to the reactor, and then the solutions of Parts 3 and 4 were added in parallel over 4 hours and 90 minutes, respectively while maintaining the refluxing temperature (72° C.). After the addition of the solution of Part 4, the solution of Part 5 was added over 75 minutes. Thereafter, the solution of Part 6 was added over 75 minutes. After the addition of the solution of Part 6, the mixture was maintained at the refluxing temperature for 1 hour, and then the reaction was terminated to obtain a macromonomer.

| Preparation of graft polymer | |
|---|---|
| Part I | |
| Macromonomer obtained in the above | 114.9 parts |
| 2-Pyrollidone | 20.0 parts |
| Part II | |
| tert-Butyl peroxypivalate | 1.1 parts |
| Acetone | 10.0 parts |
| Part III | |
| Benzyl acrylate | 64.2 parts |
| 2-Pyrollidone | 20.0 parts |
| Part IV | |
| tert-Butyl peroxypivalate | 2.3 parts |
| Acetone | 20.0 parts |
| Part V | |
| tert-Butyl peroxypivalate | 1.1 parts |
| Acetone | 10.0 parts |

The components of Part I were charged in a 500 ml reactor equipped with a nitrogen inlet and heated to a refluxing temperature under the nitrogen atmosphere and maintained at the refluxing temperature for 10 minutes. The components of Part II were added to the reactor, and then the components of Parts III and IV were added simultaneously over 3 hours while maintaining the refluxing temperature. After the addition of the components of Parts III and IV, the reaction was continued at the refluxing temperature for 1 hour, and the components of Part V were added over 1 hour. Thereafter, the mixture was heated at a reaction temperature of 60° C. for 2 hours while refluxing. After that, volatiles (74.5 parts) were distilled off, and 2-pyrollidone (111.6 parts) was added to obtain a graft polymer.

The synthesis of this polymer was more troublesome than Synthesis Examples 1 to 4. Thus, the preparation of an ink using such a graft polymer is time-consuming and needs costs as a whole.

Example 1

The following materials were dispersed with a sand mill using zirconia beads having a particle size of 0.3 mm for 1 hour to obtain a dispersion composition:

| | |
|---|---|
| Black pigment (trade name: Printex 75 available from Degussa) | 20.0 parts |
| Polymer of Synthetic Example 1 | 8.0 parts |
| Ion-exchanged water | 72.0 parts |

The particle size of the pigment dispersed in the above composition was 87 nm.

Using this dispersion composition, a black ink for ink jet printers having the following composition was prepared:

| | |
|---|---|
| Above dispersion composition | 22.5 parts |
| Glycerin | 8.0 parts |
| Diethylene glycol | 5.0 parts |
| Trimethylolpropane | 7.0 parts |
| S-120 (sorbitan type surfactant having HLB of 12.8 manufactured by KAO) | 2.0 parts |
| Ion-exchanged water | 57.5 parts |

Next, a cyan dispersion composition and a cyan ink, a magenta dispersion composition and a magenta ink, and a yellow dispersion composition and a yellow ink were prepared by the same method for the preparation of the black dispersion composition and the black ink except that each of the following pigments was used in place of the black pigment:

Cyan pigment:

Fastogen Blue TGR (manufactured by Dainippon Ink and Chemical)

Magenta pigment:

Fastogen Super Magenta RTS (manufactured by Dainippon Ink and Chemical)

Yellow Pigment:

Symuler Fast Yellow 4190 (manufactured by Dainippon Ink and Chemical)

The properties of these dispersion compositions and inks are shown in Table 1.

The inks comprising the above dispersion compositions had good storage stability. The printing qualities of the inks were evaluated using CANON BJF-6000. As a result, the inks had excellent printing properties as shown in Table 1. The time and energy for the preparation of those inks could be saved since the same polymer could be used to prepare the dispersion compositions.

Comparative Example 1

A black dispersion composition and a black ink, a cyan dispersion composition and a cyan ink, a magenta dispersion composition and a magenta ink, and a yellow dispersion composition and a yellow ink were prepared in the same manner as in Example 1 except that the styrene-acrylic copolymer resin of Synthetic Example 5 was used in place of the polymer of Synthetic Example 1.

In comparison with Example 1, in the cases of the yellow and magenta inks comprising such dispersion compositions, the particle sizes increased after the long-term storage, that is, the storage stability was worse. Thus, the full color inks could not be used using the same polymer. When the printing qualities of the inks were evaluated using CANON BJF-6000, the printing properties of the magenta and yellow inks were not satisfactory.

Example 2

A black dispersion composition and a black ink, a cyan dispersion composition and a cyan ink, a magenta dispersion composition and a magenta ink, and a yellow dispersion composition and a yellow ink were prepared in the same manner as in Example 1 except that 12 g of the polymer of Synthetic Example 2 was used in place of the polymer of Synthetic Example 1.

The cyan, magenta, yellow and black inks using such dispersion compositions had good storage stability. The printing qualities of the inks were evaluated using CANON BJF-6000. As a result, the inks had excellent printing properties as shown in Table 1. The time and energy for the preparation of those inks could be saved since the same polymer could be used to prepare the dispersion compositions.

Example 3

A black dispersion composition and a black ink, a cyan dispersion composition and a cyan ink, a magenta dispersion composition and a magenta ink, and a yellow dispersion composition and a yellow ink were prepared in the same manner as in Example 1 except that 12 g of the polymer of Synthetic Example 3 was used in place of the polymer of Synthetic Example 1.

The cyan, magenta, yellow and black inks using such dispersion compositions had good storage stability and also excellent printing properties. The time and energy for the preparation of those inks could be saved since the same polymer could be used to prepare the dispersion compositions.

Example 4

The following materials were dispersed with a sand mill using zirconia beads having a particle size of 0.3 mm for 1 hour to obtain a dispersion composition:

| | |
|---|---|
| Black pigment (trade name: Printex 75 available from Degussa) | 20.0 parts |
| Polymer of Synthetic Example 4 | 12.0 parts |
| Ion-exchanged water | 68.0 parts |

The particle size of the pigment dispersed in the above composition was 87 nm.

Using this dispersion composition, a black ink for ink jet printers having the following composition was prepared:

| | |
|---|---|
| Above dispersion composition | 22.5 parts |
| Glycerin | 9.0 parts |
| Sodium benzoate | 0.05 part |
| Lithium nitrate | 0.27 part |
| Acetylene glycol | 0.06 part |
| Ion-exchanged water | 68.12 parts |

Next, a cyan dispersion composition and a cyan ink, a magenta dispersion composition and a magenta ink, and a yellow dispersion composition and a yellow ink were prepared by the same method for the preparation of the black dispersion composition and the black ink except that each of the following pigments was used in place of the black pigment:

Cyan pigment:

Fastogen Blue TGR (manufactured by Dainippon Ink and Chemical)

Magenta pigment:

Fastogen Super Magenta RTS (manufactured by Dainippon Ink and Chemical)

Yellow Pigment:

Symuler Fast Yellow 4190 (manufactured by Dainippon Ink and Chemical)

The properties of these dispersion compositions and inks are shown in Table 1.

The inks comprising the above dispersion compositions had good storage stability. The printing qualities of the inks were evaluated using CITECS Continuous Ink Jet Printer. As a result, the inks had excellent printing properties as shown in Table 1. The time and energy for the preparation of those inks could be saved since the same polymer could be used to prepare the dispersion compositions.

Comparative Example 2

A black dispersion composition and a black ink, a cyan dispersion composition and a cyan ink, a magenta dispersion composition and a magenta ink, and a yellow dispersion composition and a yellow ink were prepared in the same manner as in Example 4 except that a commercially available styrene-acrylic resin (JOHNCRYL 679L of Johnson Polymer; neutralized with sodium hydroxide; non-volatile content being adjusted to 50%) was used in place of the polymer of Synthetic Example 4.

In comparison with Example 4, in the cases of the yellow and magenta inks comprising such dispersion compositions, the particle sizes increased after the long-term storage as shown in Table 1, that is, the storage stability was worse. Thus, the full color inks could not be used using the same polymer.

All the properties measured in Examples 1 to 4 and Comparative Examples 1 and 2 are summarized in Table 1.

TABLE 1

| | Dispersion composition Particle size (nm) | Ink | | | | Printing evaluation | |
|---|---|---|---|---|---|---|---|
| | | Original | | After storage at 60° C. for 2 weeks | | | |
| | | Particle Size (nm) | Viscosity (cp) | Particle Size (nm) | Viscosity (cp) | Ejection stability | Reliability |
| Ex. 1 | | | | | | | |
| Black | 87 | 86 | 2.6 | 89 | 2.6 | A | A |
| Cyan | 115 | 113 | 2.7 | 118 | 2.6 | A | A |
| Magenta | 125 | 127 | 2.8 | 129 | 2.8 | A | A |
| Yellow | 158 | 153 | 2.6 | 161 | 2.6 | A | A |
| C. Ex. 1 | | | | | | | |
| Black | 89 | 88 | 2.7 | 91 | 2.7 | A | C |
| Cyan | 124 | 126 | 2.6 | 131 | 2.6 | B | C |
| Magenta | 156 | 167 | 2.7 | 195 | 3.1 | B | C |
| Yellow | 149 | 151 | 2.6 | 205 | 3.5 | B | C |
| Ex. 2 | | | | | | | |
| Black | 93 | 88 | 2.7 | 91 | 2.6 | A | A |
| Cyan | 124 | 122 | 2.9 | 125 | 2.8 | A | A |
| Magenta | 129 | 128 | 2.9 | 131 | 2.9 | A | A |
| Yellow | 151 | 154 | 2.7 | 159 | 2.6 | A | A |
| Ex. 3 | | | | | | | |
| Black | 84 | 83 | 2.6 | 88 | 2.6 | A | A |
| Cyan | 112 | 118 | 2.6 | 110 | 2.6 | A | A |
| Magenta | 141 | 142 | 2.7 | 135 | 2.6 | A | A |
| Yellow | 151 | 149 | 2.5 | 164 | 2.5 | A | A |
| Ex. 4 | | | | | | | |
| Black | 93 | 89 | 1.8 | 89 | 1.7 | A | A |
| Cyan | 123 | 119 | 1.8 | 121 | 1.8 | A | A |
| Magenta | 133 | 126 | 1.7 | 129 | 1.8 | A | A |
| Yellow | 141 | 148 | 1.6 | 151 | 1.5 | A | A |
| C. Ex. 2 | | | | | | | |
| Black | 93 | 95 | 1.6 | 94 | 1.6 | A | Not evaluated |
| Cyan | 121 | 127 | 1.8 | 127 | 1.8 | B | |
| Magenta | 131 | 135 | 1.9 | 255 | 2.9 | B | |
| Yellow | 162 | 161 | 1.5 | 221 | 2.1 | B | |

The particle sizes were measured with a laser-Doppler type particle size distribution meter N4 PLUS (manufactured by Coulter), and the viscosity was measured with a R type viscometer (manufactured by TOKO SANGYO).

The ejection stability in printing evaluation tests was evaluated by printing plain paper sheets continuously and ranked as follows:

When 1000 sheets could be printed without dot failure, it was ranked "A", when less than 1000 sheets could be printed without dot failure, it was ranked "B", and when no printing was possible from the early stage, it was ranked "C".

The reliability was evaluated as follows:

Each ink was placed in the printer and maintained at room temperature for one month, and then used for printing. When the ink could be used for printing without cleaning of the head, it was ranked "A", when it could be used for printing with cleaning of the head, it was ranked "B", and when it could not be used to print even with cleaning of the head, it was ranked "C".

The dispersion composition of the present invention can achieve the satisfactory stability of the colorant irrespective of the kind of the colorant, and allows the inks to be formulated to have the same composition. Therefore, the works and time, costs and energy necessary for the preparation of the inks or paints can be reduced. The ink jet printer inks of the present invention have good storage stability and printing stability since they use the dispersion compositions of the present invention.

What is claimed is:

1. A dispersion composition comprising a colorant and an acrylic polymer having the furan structure, wherein said acrylic polymer comprises 3 to 50 wt. % of the monomer having the furan structure based on the whole weight of the polymer and has an acid value of 30 to 400 mg-KOH/g.

2. The dispersion composition according to claim 1, wherein said furan structure is furfuryl.

3. The dispersion composition according to claim 1, wherein said acrylic polymer is a copolymer comprising at least one monomer having the furan structure and at least one other monomer having a solubility parameter of 9.5 or less.

4. The dispersion composition according to claim 1, wherein said acrylic polymer has a weight average molecular weight of 3000 to 50,000.

5. An ink for an ink jet printer comprising the dispersion composition according to claim 1, 2, 3 or 4.

* * * * *